(12) United States Patent
Li et al.

(10) Patent No.: US 12,322,394 B2
(45) Date of Patent: *Jun. 3, 2025

(54) METHOD, APPARATUS, SYSTEM, ELECTRONIC DEVICE FOR PROCESSING INFORMATION AND STORAGE MEDIUM

(71) Applicant: Beijing Baidu Netcom Science and Technology Co., Ltd., Beijing (CN)

(72) Inventors: Xingbiao Li, Beijing (CN); Hanmei Xie, Beijing (CN); Huimin Fan, Beijing (CN); Huibin Zhao, Beijing (CN); Meiyuan Ding, Beijing (CN); Lina Hu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 667 days.

This patent is subject to a terminal disclaimer.

(21) Appl. No.: 17/351,140

(22) Filed: Jun. 17, 2021

(65) Prior Publication Data

US 2021/0312926 A1   Oct. 7, 2021

(30) Foreign Application Priority Data

Oct. 22, 2020 (CN) .......................... 202011140819.X

(51) Int. Cl.
*G10L 15/00* (2013.01)
*G06F 40/149* (2020.01)
(Continued)

(52) U.S. Cl.
CPC ............ *G10L 15/26* (2013.01); *G06F 40/149* (2020.01); *G06F 40/166* (2020.01); *G06N 20/00* (2019.01);
(Continued)

(58) Field of Classification Search
CPC ......... G10L 25/51; G10L 25/48; G10L 15/22; G10L 15/26; G10L 15/30; G10L 17/00;
(Continued)

(56) References Cited

U.S. PATENT DOCUMENTS 9,350,946 B2    5/2016  Liu et al.
11,315,569 B1 *  4/2022  Talieh ................. H04L 12/1831
(Continued)

FOREIGN PATENT DOCUMENTS

CA      2993704 A1 *  8/2018  ....... G06F 16/90332
CN     110322869 A     10/2019
(Continued)

OTHER PUBLICATIONS

Extended European search report dated Nov. 12, 2021 issued in EP Application No. 21178762.7.

*Primary Examiner* — Michael Ortiz-Sanchez
(74) *Attorney, Agent, or Firm* — Weaver Austin Villeneuve & Sampson LLP

(57) ABSTRACT

The present disclosure discloses a method, apparatus, system and electronic device for processing information and storage medium, relates to artificial intelligence technology fields such as speech recognition, speech synthesis and natural language processing. An implementation solution is: receiving audio data of a corresponding role sent by each client, and determining a role identifier of each of the audio data and starting time of each of the audio data; converting each of the received audio data to generate each text information; performing merging operation, in response to receiving a merging operation instruction and not meeting a merging stop condition, on all text information to generate each first text; and performing integration operation, in (Continued)

response to meeting the merging stop condition, on each of the first text to generate a second text corresponding to each of the first text.

20 Claims, 5 Drawing Sheets

(51) Int. Cl.
| | |
|---|---|
| *G06F 40/166* | (2020.01) |
| *G06N 20/00* | (2019.01) |
| *G06Q 10/105* | (2023.01) |
| *G06Q 10/109* | (2023.01) |
| *G10L 15/22* | (2006.01) |
| *G10L 15/26* | (2006.01) |
| *G10L 15/30* | (2013.01) |
| *G10L 25/51* | (2013.01) |
| *H04M 1/656* | (2006.01) |
| *H04M 3/56* | (2006.01) |

(52) U.S. Cl.
CPC ......... *G06Q 10/105* (2013.01); *G06Q 10/109* (2013.01); *G10L 15/22* (2013.01); *G10L 15/30* (2013.01); *G10L 25/51* (2013.01); *H04M 1/656* (2013.01); *H04M 3/56* (2013.01); *H04M 3/568* (2013.01); *H04M 2201/40* (2013.01)

(58) Field of Classification Search
CPC ...... G06F 40/10; G06F 40/166; G06F 40/169; G06F 40/174; G06F 40/149; G06Q 10/105; G06Q 10/101; G06Q 10/109; G06Q 10/1091; G06Q 10/103; G06Q 10/10; H04M 3/56; H04M 3/42221; H04M 3/567; H04M 1/656; H04M 2201/40; H04M 2201/41; H04M 2203/5063; H04M 2203/301; H04L 65/403; H04L 51/04; H04L 12/1818; H04L 12/1822

See application file for complete search history.

(56) References Cited

U.S. PATENT DOCUMENTS

| | | | |
|---|---|---|---|
| 2013/0159708 A1* | 6/2013 | Miller | G06F 40/166 |
| | | | 707/821 |
| 2015/0149540 A1 | 5/2015 | Barker et al. | |
| 2015/0288924 A1* | 10/2015 | Liu | G06V 40/174 |
| | | | 348/14.08 |
| 2016/0284354 A1* | 9/2016 | Chen | H04N 7/15 |
| 2019/0179595 A1* | 6/2019 | De Angelis | G06F 3/165 |
| 2019/0258704 A1 | 8/2019 | Mertens et al. | |
| 2020/0211561 A1* | 7/2020 | Degraye | G10L 15/26 |

FOREIGN PATENT DOCUMENTS

| | | |
|---|---|---|
| CN | 110335612 A | 10/2019 |
| CN | 110557589 A | 12/2019 |
| JP | 2011102862 A | 5/2011 |
| JP | 2013073323 A | 4/2013 |
| JP | 2014146066 A | 8/2014 |
| JP | 2019061594 A | 4/2019 |
| JP | 2019153099 A | 9/2019 |

* cited by examiner

\*\*\*          Smart record: 2020-07-15 meeting live stream demand review

 Xiao Di (host) 00:00:00

Amao and I like collecting records and have listened to various styles of music. But when we are making music, we must forget this thing, that is, it is not that I want to try rock and roll today, and I want to try folk songs tomorrow. That's not what I mean. I think it's a kind of fusion, requiring you to fuse what you're listening to. But after you make it, others may say what this looks like, this is a little bit rock and this is a little jazz, others can comment on what it is, but when we are creating music, it is best to forget these first.

Amao now has thousands of records. No matter what style, he has very good records. You may interview him in the next issue about his collected records. Do it one by one, and you can make a series. Amao's records are all very good. It's not a joke. If you don't look for it on purpose, it will be difficult to find.

Because now the Internet platforms are full of rubbish. That is music with a lot of MSG added, but really good music is not like that.

 Xiao Wang 00:05:35

Do you pay attention to the ordinary young people in the cities now?

 13187693542 00:05:38

It feels that in the past they were still writing more about marginal characters.

 Dian Jin 00:05:50

What you care about is the whole of life. For example, I watched a lot of documentaries during the epidemic, some documentaries about the poor, some about the rich, and some documentaries about the poor in Africa, the homeless people in Paris, and those who are rich. From the experience on the work, you are more concerned about this or that, but in fact the information you get in your daily life is overall, and you are more concerned about life itself, which includes the young people you mentioned. No one can do without the totality of life, no one. Back to this, no one can leave life itself.

Fig. 5

METHOD, APPARATUS, SYSTEM, ELECTRONIC DEVICE FOR PROCESSING INFORMATION AND STORAGE MEDIUM

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of artificial intelligence technology, in particular to the technical fields of speech recognition, speech synthesis, and natural language processing, and more particular to a method and apparatus for processing information.

BACKGROUND

Artificial intelligence is a subject that studies the use of computers to simulate certain human thinking processes and intelligent behaviors (such as learning, reasoning, thinking, and planning) It has both hardware technologies and software technologies. Artificial intelligence hardware technologies typically comprise technologies such as sensors, dedicated artificial intelligence chips, cloud computing, distributed storage, and big data processing; and artificial intelligence software technologies mainly comprise computer vision technology, speech recognition technology, natural language processing technology and machine learning/depth learning, big data processing technology, knowledge graph technology and other major directions.

With the development of artificial intelligence, the use of online audio and video conferencing services has become the mainstream of daily meetings in enterprises. In actual scenarios, if a user misses a meeting and expects to be able to view the content of the meeting later, or participants in an important meeting need to review key information of the meeting, a meeting recording function becomes an important capability of audio and video conferencing software.

In a current recording scenario of an audio and video conference, a recording software adopts the form of only recording speech to save an audio or converting the speech into a whole paragraph of text. If there are many people talking at the same time, a recording effect may be poor, and the text converted from speech may be messy. Therefore, there is a need for a meeting record method that may provide users with a meeting scenario, to make it more suitable for the users to quickly review meeting information and identify meeting roles.

SUMMARY

The present disclosure provides a method, apparatus, system, and device for processing information, and a computer readable storage medium, relates to the technical field of artificial intelligence, and more particular to the technical fields of speech recognition, speech synthesis, and natural language processing.

In a first aspect, an embodiment of the present disclosure provides a method for processing information, and the method comprises: receiving audio data of a corresponding role sent by each client, and determining, based on each of the audio data, a role identifier of each of the audio data and starting time of each of the audio data corresponding to the role identifier; converting each of the received audio data to generate each text information corresponding to the role identifier of the audio data and the starting time of the audio data; performing merging operation, in response to receiving a merging operation instruction and not meeting a merging stop condition, on all text information to generate each first text corresponding to the role identifier and the starting time, the merging operation being used to represent merging of text information of a same role identifier; and performing integration operation, in response to meeting the merging stop condition, on each of the first text to generate a second text corresponding to each of the first text, the integration operation being used to represent an arrangement and combination of each of the first text based on the role identifier and the starting time.

In a second aspect, an embodiment of the present disclosure provides a system for processing information, and the system comprises: a client and a server, the client, being configured to acquire, in response to receiving an information processing request, audio data of each role at different moments; send the audio data to the server; and display, in response to receiving a second text sent by the server, based on each role identifier and corresponding starting time, the second text; and the server, being configured to perform the method for processing information as described in any one of the implementations of the first aspect.

In a third aspect, an embodiment of the present disclosure provides an apparatus for processing information, and the apparatus comprises: a receiving unit, configured to receive audio data of a corresponding role sent by each client, and determine, based on each of the audio data, a role identifier of each of the audio data and starting time of each of the audio data corresponding to the role identifier; a conversion unit, configured to convert each of the received audio data to generate each text information corresponding to the role identifier of the audio data and the starting time of the audio data; a merging unit, configured to perform merging operation, in response to receiving a merging operation instruction and not meeting a merging stop condition, on all text information to generate each first text corresponding to the role identifier and the starting time, the merging operation being used to represent merging of text information of a same role identifier; and an information processing unit, configured to perform integration operation, in response to meeting the merging stop condition, on each of the first text to generate a second text corresponding to each of the first text, the integration operation being used to represent an arrangement and combination of each of the first text based on the role identifier and the starting time.

In a forth aspect, an embodiment of the present disclosure provides an electronic device, and the electronic device comprises: at least one processor; and a memory communicatively connected with the at least one processor, where the memory stores instructions executable by the at least one processor, and the instructions, when executed by the at least one processor, cause the at least one processor to execute the method for processing information as described in any one of the implementations of the first aspect.

In a fifth aspect, an embodiment of the present disclosure provides a non-transitory computer readable storage medium storing computer instructions, where the computer instructions cause a computer to execute the method for processing information as described in any one of the implementations of the first aspect.

It shall be understood that the description in this section does not intend to identify key or critical features of the embodiments of the disclosure, nor does it intend to limit the scope of the disclosure. Other features of the present disclosure will become readily apparent from the following description.

BRIEF DESCRIPTION OF THE DRAWINGS

The accompanying drawings are used to better understand the present solution, and do not constitute a limitation to the present disclosure.

FIG. 5 is a schematic diagram of an interface displayed to a user of the method for processing information according to the present disclosure;

DETAILED DESCRIPTION OF EMBODIMENTS

The following describes exemplary embodiments of the present disclosure in conjunction with the accompanying drawings, which comprises various details of the embodiments of the present disclosure to facilitate understanding, and they should be considered as merely exemplary. Therefore, those of ordinary skills in the art should recognize that various changes and modifications may be made to the embodiments described herein without departing from the scope and spirit of the present disclosure. Also, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
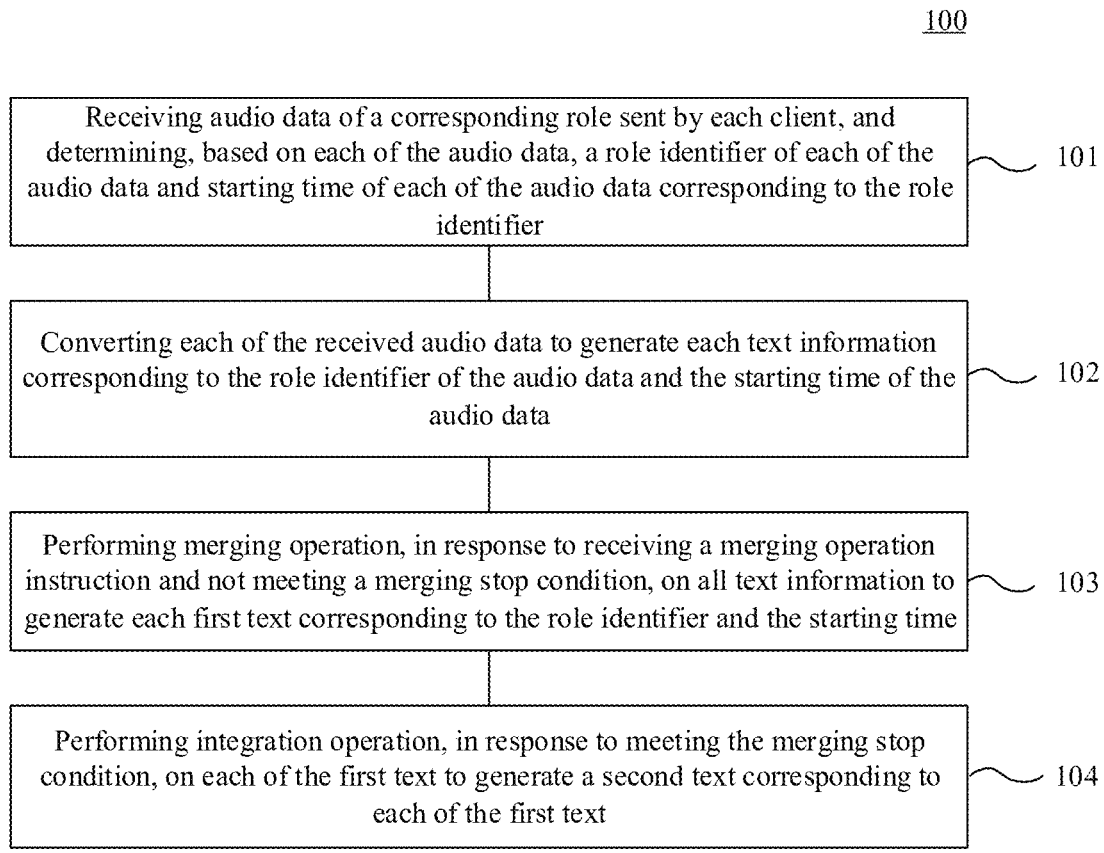
FIG. 1 is a schematic diagram of an embodiment of a method for processing information according to the present disclosure.

FIG. 1 shows a schematic diagram 100 of an embodiment of a method for processing information according to the present disclosure. The method for processing information comprises the following steps:

Step 101, receiving audio data of a corresponding role sent by each client, and determining, based on each of the audio data, a role identifier of each of the audio data and starting time of each of the audio data corresponding to the role identifier.

In the present embodiment, when an executing body (for example, a server or a cloud platform) receives an information processing request sent by the client, it may receive the audio data of the corresponding role sent by each client through a wired connection or a wireless connection, and then perform content analysis on each audio data or use each audio data to query a database to determine the role identifier of each of the audio data and the starting time of each of the audio data corresponding to the role identifier. In this embodiment, the client may listen to a meeting record event sent by a user (for example, a predetermined button\menu or an event of a set shortcut key being clicked\triggered), receive the user's meeting record instruction, and based on the meeting record instruction, generate and send the information processing request. Each role may represent each speaker account registered in a meeting software. The audio data of each role may represent audio data of each role speaking at different moments in a meeting scenario. The audio data at different moments may be obtained by judging whether a time interval of the audio data is greater than a preset threshold based on a preset duration. For example, if it is determined that a pause duration in a long speech of the same role exceeds 5 seconds then segmentation is performed, that is, being audio data at the next moment, or a speech duration of the same role lasts 60 seconds, then if a pause duration in the speech of the role exceeds 2 seconds, segmentation is performed. It should be noted that the above wireless connection may comprise, but is not limited to, 3G, 4G, 5G connections, WiFi connection, Bluetooth connection, WiMAX connection, Zigbee connection, UWB (ultra wideband) connection, and other wireless connections that are currently known or developed in the future.

Step 102, converting each of the received audio data to generate each text information corresponding to the role identifier of the audio data and the starting time of the audio data.

In the present embodiment, the executing body may convert each of the audio data of different roles received in step 101 according to a speech translation method, to generate each of the text information corresponding to the role identifier of the audio data and the starting time of the audio data.

Step 103, performing merging operation, in response to receiving a merging operation instruction and not meeting a merging stop condition, on all text information to generate each first text corresponding to the role identifier and the starting time.

In the present embodiment, when receiving the merging operation instruction and determining that merging does not meet the merging stop condition, the executing body performs merging operation on all the text information to generate each of the first text corresponding to the role identifier and the starting time. The merging operation is used to represent merging of text information of a same role identifier, and the merging stop condition may be preset. Here, the merging stop condition may be set based on a merging duration and/or a size of a merging text. For example, when the merging duration reaches 60 minutes, it may be determined that the merging stop condition is met, and/or when the size of the merging text (i.e., a sum of a size of each of the first text) exceeds a preset threshold, it may be determined that the merging stop condition is met. The merging stop condition may also be determined based on an operation button triggered by the user, that is, when the user clicks the operation button to terminate the merging operation instruction, it may be determined that the merging stop condition is met.

Step 104, performing integration operation, in response to meeting the merging stop condition, on each of the first text to generate a second text corresponding to each of the first text.

In the present embodiment, when determining that the merging meets the merging stop condition, the executing body performs integration on each of the first text to generate the second text corresponding to each of the first text. The integration operation is used to represent an arrangement and combination of each of the first text based on the role identifier and the starting time.

Figure 2:
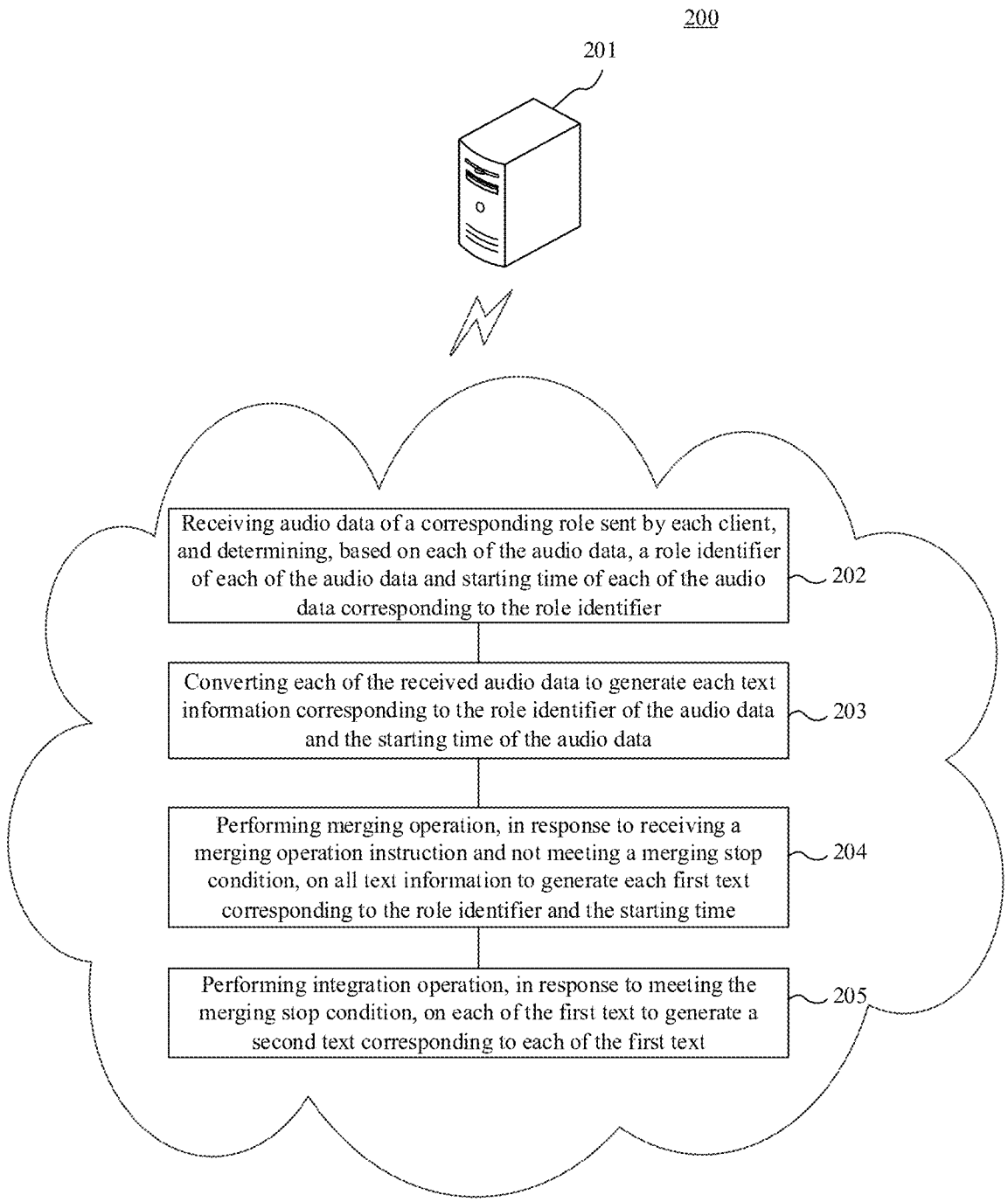
FIG. 2 is a scenario diagram that may implement the method for processing information according to an embodiment of the present disclosure.

With further reference to FIG. 2, the method 200 for processing information of the present embodiment runs in an electronic device 201. When the electronic device 201 receives an information processing request, the electronic device 201 first receives audio data of a corresponding role sent by each client, and based on each audio data, determines a role identifier of each of the audio data and starting time 202 of each of the audio data corresponding to the role identifier. Then, the electronic device 201 converts the received each of the audio data to generate each text information 203 corresponding to the role identifier of the audio data and the starting time of the audio data. When receiving a merging operation instruction and not meeting a merging stop condition, the electronic device 201 performs merging operation on all text information to generate each first text 204 corresponding to the role identifier and the starting time. When meeting the merging stop condition, the electronic device 201 performs integration operation on each of the first text to generate a second text 205 corresponding to each of the first text, and sends the second text to each client or a first designated client.

The method for processing information provided by the above embodiment of the present disclosure, by receiving audio data of a corresponding role sent by each client, and determining, based on each of the audio data, a role identifier of each of the audio data and starting time of each of the audio data corresponding to the role identifier; converting each of the received audio data to generate each text information corresponding to the role identifier of the audio data and the starting time of the audio data; performing merging operation, in response to receiving a merging operation instruction and not meeting a merging stop condition, on all text information to generate each first text corresponding to the role identifier and the starting time; and performing integration operation, in response to meeting the merging stop condition, on each of the first text to generate a second text corresponding to each of the first text, realizes a method for receiving and converting audio data of different roles in a plurality of clients, and then determining and sending information through text integration. By receiving the audio data of different roles in the client separately, and performing voice acquisition and processing based on the different roles, the method avoids the problem of poor recording effect if many people are talking online at the same time in the prior art. Through role-based acquisition and role-based conversion of audio, each of the text information corresponding to the role identifier of the audio data and the starting time of the audio data is generated, the method avoids the problem of confusion in conversion from speech to text in the prior art. In a meeting scenario, the method may realize visualization of a meeting content, by converting a meeting audio into text form and sending to the client, it is used to present the text information to the user, which is convenient for the user to review the meeting content in an orderly and fast approach, saving the user's query time and improving the user's reading experience.

Figure 3:
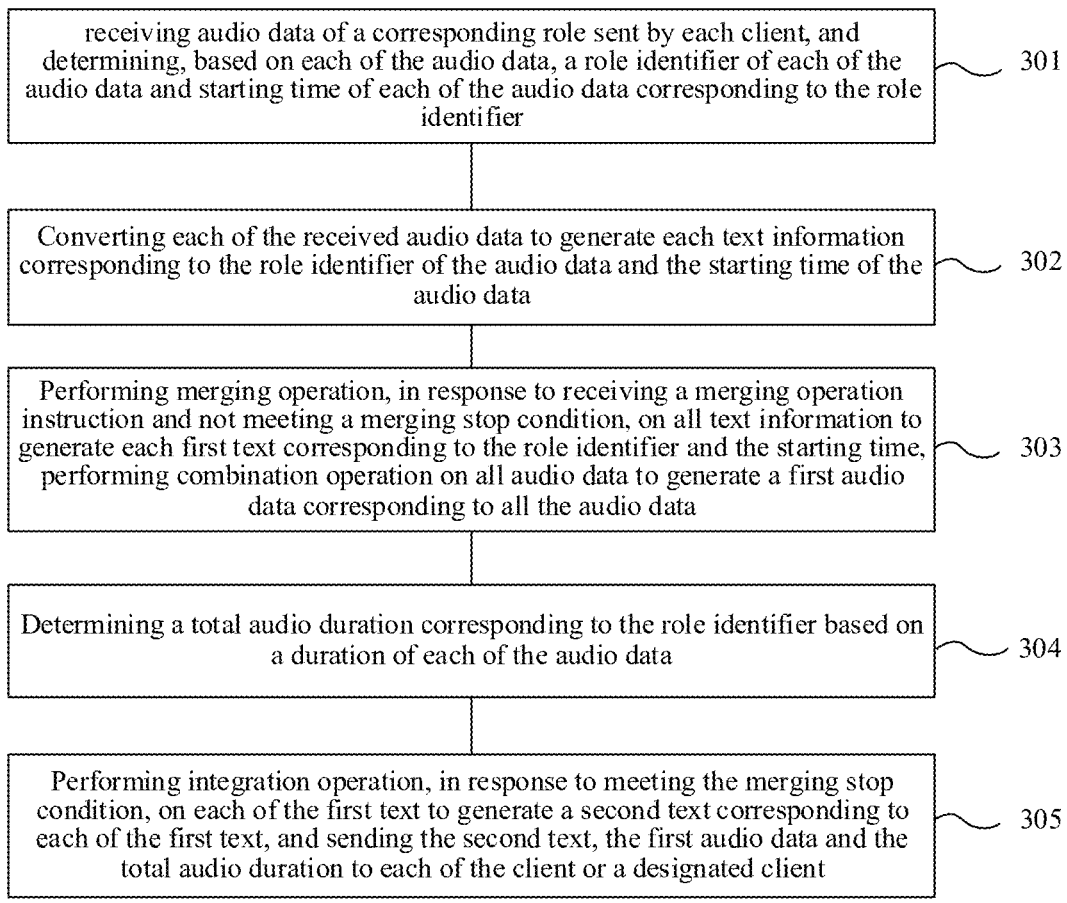
FIG. 3 is a schematic diagram of another embodiment of the method for processing information according to the present disclosure.

With further reference to FIG. 3, a schematic diagram 300 of another embodiment of the method for processing information is illustrated. A flow of the method comprises the following steps:

Step 301, receiving audio data of a corresponding role sent by each client, and determining, based on each of the audio data, a role identifier of each of the audio data and starting time of each of the audio data corresponding to the role identifier.

Step 302, converting each of the received audio data to generate each text information corresponding to the role identifier of the audio data and the starting time of the audio data.

Step 303, performing merging operation, in response to receiving a merging operation instruction and not meeting a merging stop condition, on all text information to generate each first text corresponding to the role identifier and the starting time, performing combination operation on all audio data to generate a first audio data corresponding to all the audio data.

In the present embodiment, after receiving the merging operation instruction and determining that the merging does not meet the merging stop condition, the executing body may perform merging operation on all the text information to generate each of the first text corresponding to the role identifier and the starting time, and at the same time perform combination operation on all the audio data to generate the first audio data corresponding to all the audio data. The combination operation is used to represent that all the audio data are sorted based on the starting time of each of the audio data.

In some alternative implementations of the present embodiment, the merging operation instruction is triggered based on receiving audio data of a same role sent by the client; or the merging operation instruction is triggered based on a current time point exceeding a time point specified by a preset threshold. By setting various trigger conditions of the merging operation instruction, flexible and diverse text merging may be realized, which meets various needs of the system and the user, and improves a system efficiency at the same time.

Step 304, determining a total audio duration corresponding to the role identifier based on a duration of each of the audio data.

In the present embodiment, the executing body may determine the total audio duration corresponding to the role identifier based on the duration of each of the audio data. The total audio duration is used to represent a cumulative duration of each of the audio data of the same role identifier in a certain period of time.

Step 305, performing integration operation, in response to meeting the merging stop condition, on each of the first text to generate a second text corresponding to each of the first text, and sending the second text, the first audio data and the total audio duration to each of the client or a second designated client.

In the present embodiment, when determining that the merging meets the merging stop condition, the executing body may perform integration operation on each of the first text to generate the second text corresponding to each of the first text, and then send the second text, the first audio data generated in step 303, and the total audio duration determined in step 304 to each of the client or the third designated client for display to the user.

It should be noted that the above condition determination and data integration methods are well-known technologies that are currently widely studied and applied, and detailed description thereof will be omitted.

In the present embodiment, the particular operations of steps 301 and 302 are basically the same as the operations of steps 101 and 102 in the embodiment shown in FIG. 1, and detailed description thereof will be omitted.

It may be seen from FIG. 3 that, compared with the embodiment corresponding to FIG. 1, the schematic diagram 300 of the method for processing information in the present embodiment adopts the method of performing merging operation, in response to receiving a merging operation instruction and not meeting a merging stop condition, on all text information to generate each first text corresponding to the role identifier and the starting time, and performing combination operation on all audio data to generate a first audio data corresponding to all the audio data, determining a total audio duration corresponding to the role identifier based on a duration of each of the audio data, performing integration operation, in response to meeting the merging stop condition, on each of the first text to generate a second text corresponding to each of the first text, and sending the second text, the first audio data and the total audio duration to each of the client or a third designated client. The method solves the problem that the existing third-party software may only record sound of a local machine, and sound transmitted by other terminals in a meeting is prone to leakage, duplication, and sound reduction. The method realizes richer information transmission for showing the user more comprehensive and diverse information comprising audio, text, and audio-related information.

Figure 4:
FIG. 4 is a schematic structural diagram of an embodiment of a system for processing information according to the present disclosure.

With further reference to FIG. 4, the present disclosure provides a system for processing information. As shown in FIG. 4, the system for processing information comprises: a client 401 and a server 402. The client is configured to acquire, in response to receiving an information processing request, audio data of each role at different moments, and send the audio data to the server, and display, in response to receiving a second text sent by the server, based on each role identifier and corresponding starting time, the second text, as shown in FIG. 5; and the server is configured to perform the above method for processing information. For detailed description, in the process of displaying the text, if many people speak at the same period of time, the speech may be sorted according to a principle of speaking first. If many people speak at the same start time, the speech may be sorted according to initials of the speakers' names, numbers.

In the system, the client is further configured to display, in response to receiving a first audio data sent by the server, a voice map corresponding to the first audio data. When the client receives the first audio data sent by the server, it may display the voice map corresponding to the first audio data to the user, as shown in FIG. 5.

In the system, the client is further configured to acquire, in response to receiving a playback operation triggered on the voice map, audio data corresponding to the playback operation, and determine, based on the audio data, each role identifier corresponding to the audio data, each starting time corresponding to the role identifier and each text information corresponding to the role identifier and the starting time; acquire, in response to receiving a selection operation triggered on the displayed second text, text information in the second text corresponding to the selection operation, and determine audio data corresponding to the text information based on the text information in the second text; and play a speech represented by the audio data, and display, in response to the text information corresponding to the speech being located on a current page, each text information corresponding to the speech. The system realizes that when many people speak at the same time, multi-person text positioning may be performed at the same time and text may be highlighted word by word. By mutual positioning of text and speech, in a speech playing process, text may automatically scroll with the speech playing, and the text may be highlighted word by word with the speech playing.

In the system, the client is further configured to display a jump button, in response to detecting that the text information corresponding to the speech is not located on the current page. The system solves the problem that currently a whole paragraph of text is stacked and displayed, and the user cannot easily and quickly identify and locate key information, when playing speech, the user needs to pay close attention to corresponding text information, which consumes energy and has poor readability. The system improves an efficiency of identifying and positioning key information.

In the system, the client is further configured to display, in response to receiving a total audio duration corresponding to the role identifier sent by the server, the total audio duration based on the role identifier. The system realizes richer and more diverse information display to meet different needs of the user.

In the system, the client is further configured to generate a meeting minutes corresponding to the second text, based on the second text and a meeting minutes template. Referring to FIG. 5, through text merging and text integration, texts of all speakers in an entire meeting are merged and restored into a complete meeting content, so that the user may scroll through and find text as needed. Using the displaying form of speaker, speaking time and speaking content allows the user to read the meeting content more clearly and methodically, saving the user's energy and improving reading experience.

It may be seen from FIG. 4 that the system for processing information solves the problem that currently a whole paragraph of text is stacked and displayed, and the user cannot easily and quickly identify and locate key information. The user may directly copy text content or extract key meeting information to write a related document (such as meeting minutes), which improves an efficiency of document writing. Displaying text and voice map at the same time realizes richer information display and further meets various needs of the user.

Figure 6:
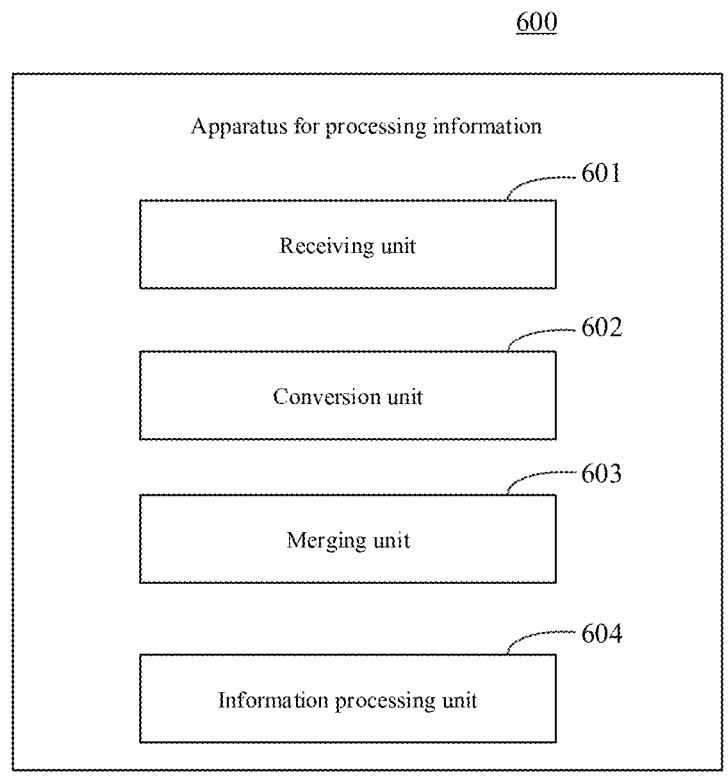
FIG. 6 is a schematic structural diagram of an embodiment of an apparatus for processing information according to the present disclosure.

With further reference to FIG. 6, as an implementation of the method shown in the above FIGS. 1-3, the present disclosure provides an embodiment of an apparatus for processing information. The apparatus embodiment corresponds to the method embodiment shown in FIG. 1. The apparatus may be applied to various electronic devices.

As shown in FIG. 6, an apparatus 600 for processing information of the present embodiment comprises: a receiving unit 601, a conversion unit 602, a merging unit 603 and an information processing unit 604. The receiving unit is configured to receive audio data of a corresponding role sent by each client, and determine, based on each of the audio data, a role identifier of each of the audio data and starting time of each of the audio data corresponding to the role identifier. The conversion unit is configured to convert each of the received audio data to generate each text information corresponding to the role identifier of the audio data and the starting time of the audio data. The merging unit is configured to perform merging operation, in response to receiving a merging operation instruction and not meeting a merging stop condition, on all text information to generate each first text corresponding to the role identifier and the starting time, the merging operation being used to represent merging of text information of a same role identifier. The information processing unit is configured to perform integration operation, in response to meeting the merging stop condition, on each of the first text to generate a second text corresponding to each of the first text, the integration operation being used to represent an arrangement and combination of each of the first text based on the role identifier and the starting time.

In the present embodiment, for the particular processing and the technical effects of the receiving unit 601, the conversion unit 602, the merging unit 603 and the information processing unit 604 in the apparatus 600 for processing information, reference may be made to the relevant description of step 101 to step 104 in the embodiment corresponding to FIG. 1 respectively, and detailed description thereof will be omitted.

In some alternative implementations of the present embodiment, the merging operation instruction of the merging unit is triggered based on receiving audio data of a same role sent by the client; or the merging operation instruction of the merging unit is triggered based on a current time point exceeding a time point specified by a preset threshold.

In some alternative implementations of the present embodiment, the apparatus also comprises: an information sending unit, configured to send the second text to each of the client or a first designated client.

In some alternative implementations of the present embodiment, the apparatus also comprises: a generation unit, configured to perform combination operation, in response to receiving the merging operation instruction and not meeting the merging stop condition, on all audio data to generate a first audio data corresponding to all the audio data, where the combination operation is used to represent that all the audio data are sorted based on the starting time of each of the audio data; and the information processing unit is further configured to send, in response to meeting the merging stop condition, the first audio data to each of the client or a second designated client.

In some alternative implementations of the present embodiment, the apparatus also comprises: a determination unit, configured to determine a total audio duration corresponding to the role identifier based on a duration of each of the audio data, where the total audio duration is used to represent a cumulative duration of each of the audio data of the same role identifier in a certain period of time; and the information processing unit is further configured to send, in response to meeting the merging stop condition, the total audio duration to each of the client or a third designated client.

Figure 7:
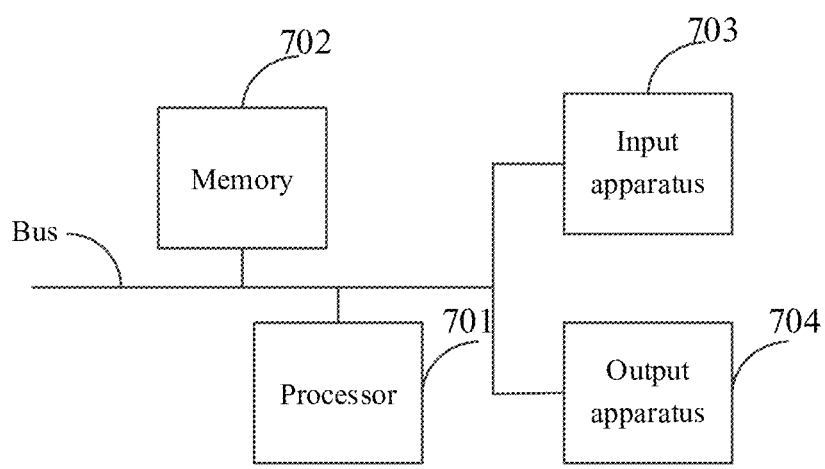
FIG. 7 is a block diagram of an electronic device used to implement the method for processing information according to an embodiment of the present disclosure.

As shown in FIG. 7, is a block diagram of an electronic device of the method for processing information according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device comprises: one or more processors 701, a memory 702, and interfaces for connecting various components, comprising high-speed interfaces and low-speed interfaces. The various components are connected to each other using different buses, and may be installed on a common motherboard or in other methods as needed. The processor may process instructions executed within the electronic device, comprising instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations (for example, as a server array, a set of blade servers, or a multi-processor system). In FIG. 7, one processor 701 is used as an example.

The memory 702 is a non-transitory computer readable storage medium provided by the present disclosure. The memory stores instructions executable by at least one processor, so that the at least one processor performs the method for processing information provided by the present disclosure. The non-transitory computer readable storage medium of the present disclosure stores computer instructions for causing a computer to perform the method for processing information provided by the present disclosure.

The memory 702, as a non-transitory computer readable storage medium, may be used to store non-transitory software programs, non-transitory computer executable programs and modules, such as program instructions/modules corresponding to the method for processing information in the embodiments of the present disclosure (for example, the receiving unit 601, the conversion unit 602, the merging unit 603 and the information processing unit 604 as shown in FIG. 6). The processor 701 executes the non-transitory software programs, instructions, and modules stored in the memory 702 to execute various functional applications and data processing of the server, that is, to implement the method for processing information in the foregoing method embodiments.

The memory 702 may comprise a storage program area and a storage data area, where the storage program area may store an operating system and an application program required by at least one function; and the storage data area may store such as data created by the use of the electronic device for processing information. In addition, the memory 702 may comprise a high-speed random access memory, and may also comprise a non-transitory memory, such as at least one magnetic disk storage device, a flash memory or other non-transitory solid state storage devices. In some embodiments, the memory 702 may optionally comprise a memory disposed remotely relative to processor 701, which may be connected through a network to the electronic device for processing information. Examples of such networks comprise, but are not limited to, the Internet, enterprise intranets, local area networks, mobile communication networks and combinations thereof.

The electronic device for processing information may also comprise: an input apparatus 703 and an output apparatus 704. The processor 701, the memory 702, the input apparatus 703 and the output apparatus 704 may be connected through a bus or in other ways, and an example of the connection through a bus is shown in FIG. 7.

The input apparatus 703 may receive input digital or character information, and generate key signal inputs related to user settings and function control of the electronic device of the method for processing information, such as touch screen, keypad, mouse, trackpad, touchpad, pointing stick, one or more mouse buttons, trackball, joystick and other input apparatuses. The output apparatus 704 may comprise a display device, an auxiliary lighting apparatus (for example, LED), a tactile feedback apparatus (for example, a vibration motor), and the like. The display device may comprise, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may comprise: being implemented in one or more computer programs that may be executed and/or interpreted on a programmable system that comprises at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) comprise machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, comprising machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (comprising acoustic input, voice input, or tactile input) may be used to receive input from the user.

The systems and technologies described herein may be implemented in a computing system that comprises backend components (e.g., as a data server), or a computing system that comprises middleware components (e.g., application server), or a computing system that comprises frontend components (for example, a user computer having a graphical user interface or a web browser, through which the user may interact with the implementations of the systems and the technologies described herein), or a computing system that comprises any combination of such backend components, middleware components, or frontend components. The components of the system may be interconnected by any form or medium of digital data communication (e.g., communication network). Examples of the communication network comprise: local area networks (LAN), wide area networks (WAN), and the Internet.

The computer system may comprise a client and a server. The client and the server are generally far from each other and usually interact through the communication network. The relationship between the client and the server is generated by computer programs that run on the corresponding computer and have a client-server relationship with each other.

According to the technical solution of the embodiments of the present disclosure, by receiving audio data of a corresponding role sent by each client, and determining, based on each of the audio data, a role identifier of each of the audio data and starting time of each of the audio data corresponding to the role identifier; converting each of the received audio data to generate each text information corresponding to the role identifier of the audio data and the starting time of the audio data; performing merging operation, in response to receiving a merging operation instruction and not meeting a merging stop condition, on all text information to generate each first text corresponding to the role identifier and the starting time; and performing integration operation, in response to meeting the merging stop condition, on each of the first text to generate a second text corresponding to each of the first text, the solution realizes a method for receiving and converting audio data of different roles in a plurality of clients, and then determining and sending information through text integration. By receiving the audio data of different roles in the clients separately, and performing voice acquisition and processing based on the different roles, the solution avoids the problem of poor recording effect if many people are talking online at the same time in the prior art. Through role-based acquisition and role-based conversion of audio, each of the text information corresponding to the role identifier of the audio data and the starting time of the audio data is generated, the solution avoids the problem of confusion in conversion from speech to text in the prior art. In a meeting scenario, the method may realize visualization of a meeting content, by converting a meeting audio into text form and sending to the client, it is used to present the text information to the user, which is convenient for the user to review the meeting content in an orderly and fast approach, saving the user's query time and improving the user's reading experience.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure may be achieved, no limitation is made herein.

The above particular embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be comprised in the protection scope of the present disclosure.

What is claimed is:

1. A method for processing information, the method comprising:

receiving audio data of a corresponding role sent by each client, and determining, based on each of the audio data, a role identifier of each of the audio data and starting time of each of the audio data corresponding to the role identifier;

converting each of the received audio data to generate each text information corresponding to the role identifier of the audio data and the starting time of the audio data;

performing merging operation, in response to receiving a merging operation instruction and not meeting a merging stop condition, on all text information to generate each first text corresponding to the role identifier and the starting time, the merging operation being used to represent merging of text information of a same role identifier, and the merging stop condition is set based on a merging duration and a size of a merging text, or is determined based on an operation button triggered by a user; and performing integration operation, in response to meeting the merging stop condition, on each of the first text to generate a second text corresponding to each of the first text, the integration operation being used to represent an arrangement and combination of each of the first text based on the role identifier and the starting time.

2. The method according to claim 1, wherein the merging operation instruction is triggered based on receiving audio data of a same role sent by the client; or the merging operation instruction is triggered based on a current time point exceeding a time point specified by a preset threshold.

3. The method according to claim 1, further comprising: sending the second text to each of the client or a first designated client.

4. The method according to claim 1, further comprising: performing combination operation, in response to receiving the merging operation instruction and not meeting the merging stop condition, on all audio data to generate first audio data corresponding to all the audio data, wherein the combination operation is used to represent that all the audio data are sorted based on the starting time of each of the audio data; and sending, in response to meeting the merging stop condition, the first audio data to each of the client or a second designated client.

5. The method according to claim 1, further comprising: determining a total audio duration corresponding to the role identifier based on a duration of each of the audio data, wherein the total audio duration is used to represent a cumulative duration of each of the audio data of the same role identifier in a certain period of time; and sending, in response to meeting the merging stop condition, the total audio duration to each of the client or a third designated client.

6. A system for processing information, the system comprising: a client and a server, the client, being configured to acquire, in response to receiving an information processing request, audio data of each role at different moments; send the audio data to the server; and display, in response to receiving a second text sent by the server, based on each role identifier and corresponding starting time, the second text; and the server, being configured to perform the method for processing information according to claim 1.

7. The system according to claim 6, wherein, the client is further configured to display, in response to receiving a first audio data sent by the server, a voice map corresponding to the first audio data.

8. The system according to claim 7, wherein, the client is further configured to acquire, in response to receiving a playback operation triggered on the voice map, audio data corresponding to the playback operation, and determine, based on the audio data, each role identifier corresponding to the audio data, each starting time corresponding to the role identifier and each text information corresponding to the role identifier and the starting time; acquire, in response to receiving a selection operation triggered on the displayed second text, text information in the second text corresponding to the selection operation, and determine audio data corresponding to the text information based on the text information in the second text; and play a speech represented by the audio data, and display, in response to the text information corresponding to the speech being located on a current page, each text information corresponding to the speech.

9. The system according to claim 8, wherein, the client is further configured to display a jump button, in response to detecting that the text information corresponding to the speech is not located on the current page.

10. The system according to claim 6, wherein, the client is further configured to display, in response to receiving a total audio duration corresponding to the role identifier sent by the server, the total audio duration based on the role identifier.

11. The system according to claim 6, wherein, the client is further configured to generate a meeting minutes corresponding to the second text, based on the second text and a meeting minutes template.

12. An electronic device, comprising:
at least one processor; and
a memory, communicatively connected to the at least one processor; wherein,
the memory, storing instructions executable by the at least one processor, the instructions, when executed by the at least one processor, cause the at least one processor to perform an operation for processing information, the operation comprising:
receiving audio data of a corresponding role sent by each client, and determining, based on each of the audio data, a role identifier of each of the audio data and starting time of each of the audio data corresponding to the role identifier;
converting each of the received audio data to generate each text information corresponding to the role identifier of the audio data and the starting time of the audio data;
performing merging operation, in response to receiving a merging operation instruction and not meeting a merging stop condition, on all text information to generate each first text corresponding to the role identifier and the starting time, the merging operation being used to represent merging of text information of a same role identifier, and the merging stop condition is set based on a merging duration and a size of a merging text, or is determined based on an operation button triggered by a user; and
performing integration operation, in response to meeting the merging stop condition, on each of the first text to generate a second text corresponding to each of the first text, the integration operation being used to represent an arrangement and combination of each of the first text based on the role identifier and the starting time.

13. The electronic device according to claim 12, wherein the merging operation instruction is triggered based on receiving audio data of a same role sent by the client; or the merging operation instruction is triggered based on a current time point exceeding a time point specified by a preset threshold.

14. The electronic device according to claim 12, the operation further comprising:
sending the second text to each of the client or a first designated client.

15. The electronic device according to claim 12, the operation further comprising:
- performing combination operation, in response to receiving the merging operation instruction and not meeting the merging stop condition, on all audio data to generate first audio data corresponding to all the audio data, wherein the combination operation is used to represent that all the audio data are sorted based on the starting time of each of the audio data; and
- sending, in response to meeting the merging stop condition, the first audio data to each of the client or a second designated client.

16. The electronic device according to claim 12, the operation further comprising:
- determining a total audio duration corresponding to the role identifier based on a duration of each of the audio data, wherein the total audio duration is used to represent a cumulative duration of each of the audio data of the same role identifier in a certain period of time; and
- sending, in response to meeting the merging stop condition, the total audio duration to each of the client or a third designated client.

17. A non-transitory computer readable storage medium, storing computer instructions, the computer instructions, being used to cause a computer to perform an operation for processing information, the operation comprising:
- receiving audio data of a corresponding role sent by each client, and determining, based on each of the audio data, a role identifier of each of the audio data and starting time of each of the audio data corresponding to the role identifier;
- converting each of the received audio data to generate each text information corresponding to the role identifier of the audio data and the starting time of the audio data;
- performing merging operation, in response to receiving a merging operation instruction and not meeting a merging stop condition, on all text information to generate each first text corresponding to the role identifier and the starting time, the merging operation being used to represent merging of text information of a same role identifier, and the merging stop condition is set based on a merging duration and a size of a merging text, or is determined based on an operation button triggered by a user; and
- performing integration operation, in response to meeting the merging stop condition, on each of the first text to generate a second text corresponding to each of the first text, the integration operation being used to represent an arrangement and combination of each of the first text based on the role identifier and the starting time.

18. The non-transitory computer readable storage medium according to claim 17, wherein the merging operation instruction is triggered based on receiving audio data of a same role sent by the client; or the merging operation instruction is triggered based on a current time point exceeding a time point specified by a preset threshold.

19. The non-transitory computer readable storage medium according to claim 17, the operation further comprising:
- sending the second text to each of the client or a first designated client.

20. The non-transitory computer readable storage medium according to claim 17, the operation further comprising:
- performing combination operation, in response to receiving the merging operation instruction and not meeting the merging stop condition, on all audio data to generate first audio data corresponding to all the audio data, wherein the combination operation is used to represent that all the audio data are sorted based on the starting time of each of the audio data; and
- sending, in response to meeting the merging stop condition, the first audio data to each of the client or a second designated client.

* * * * *